June 3, 1924.

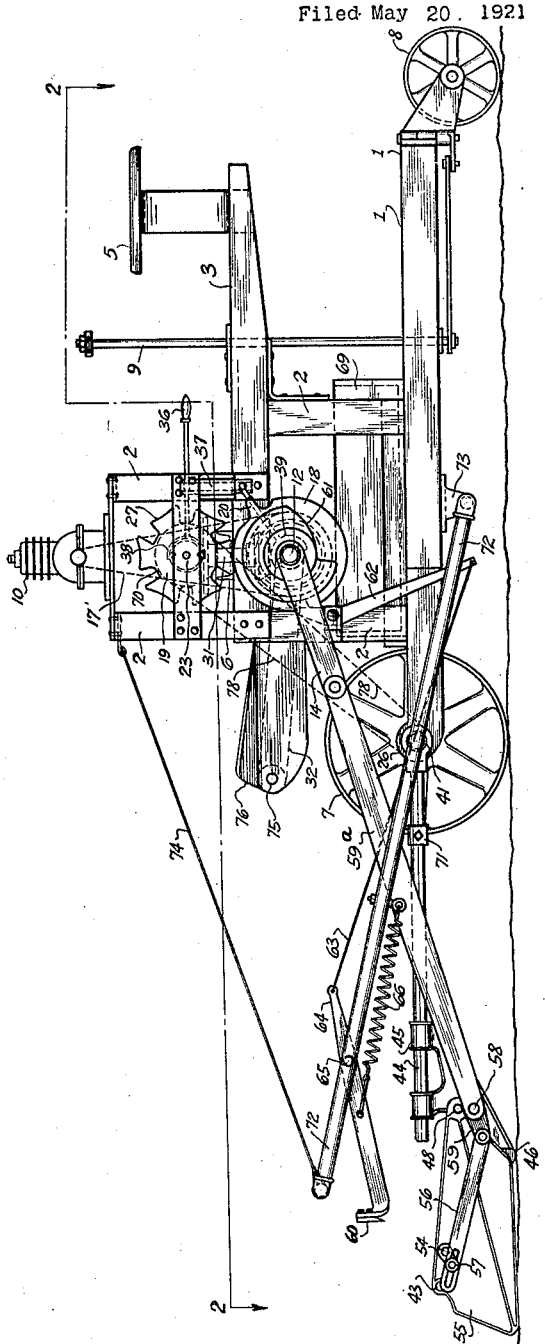

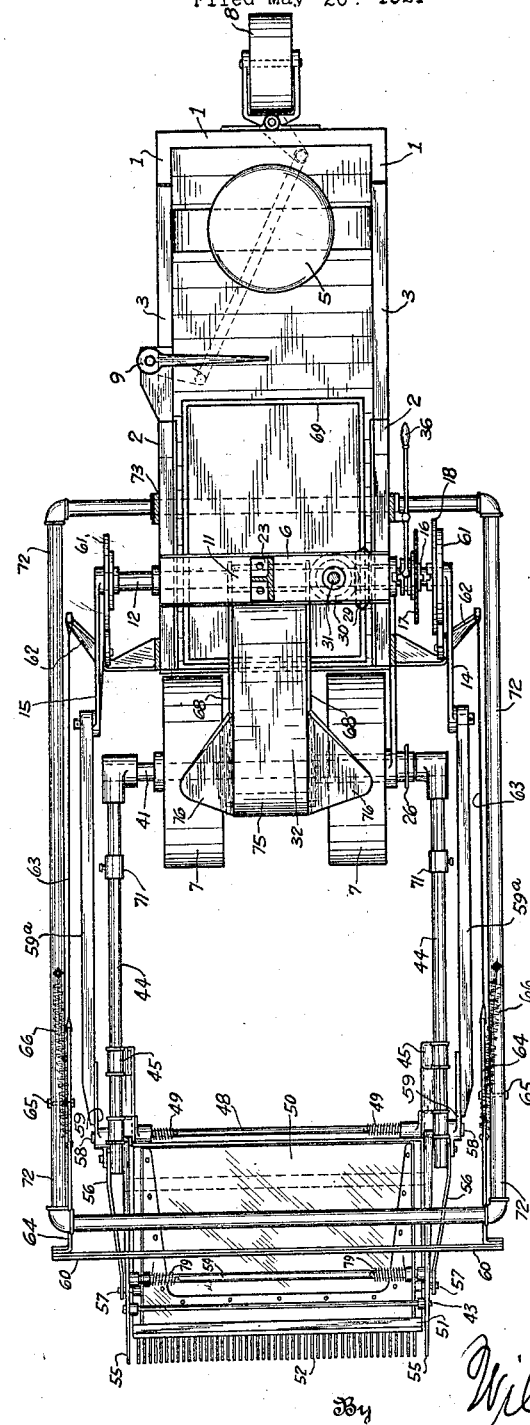

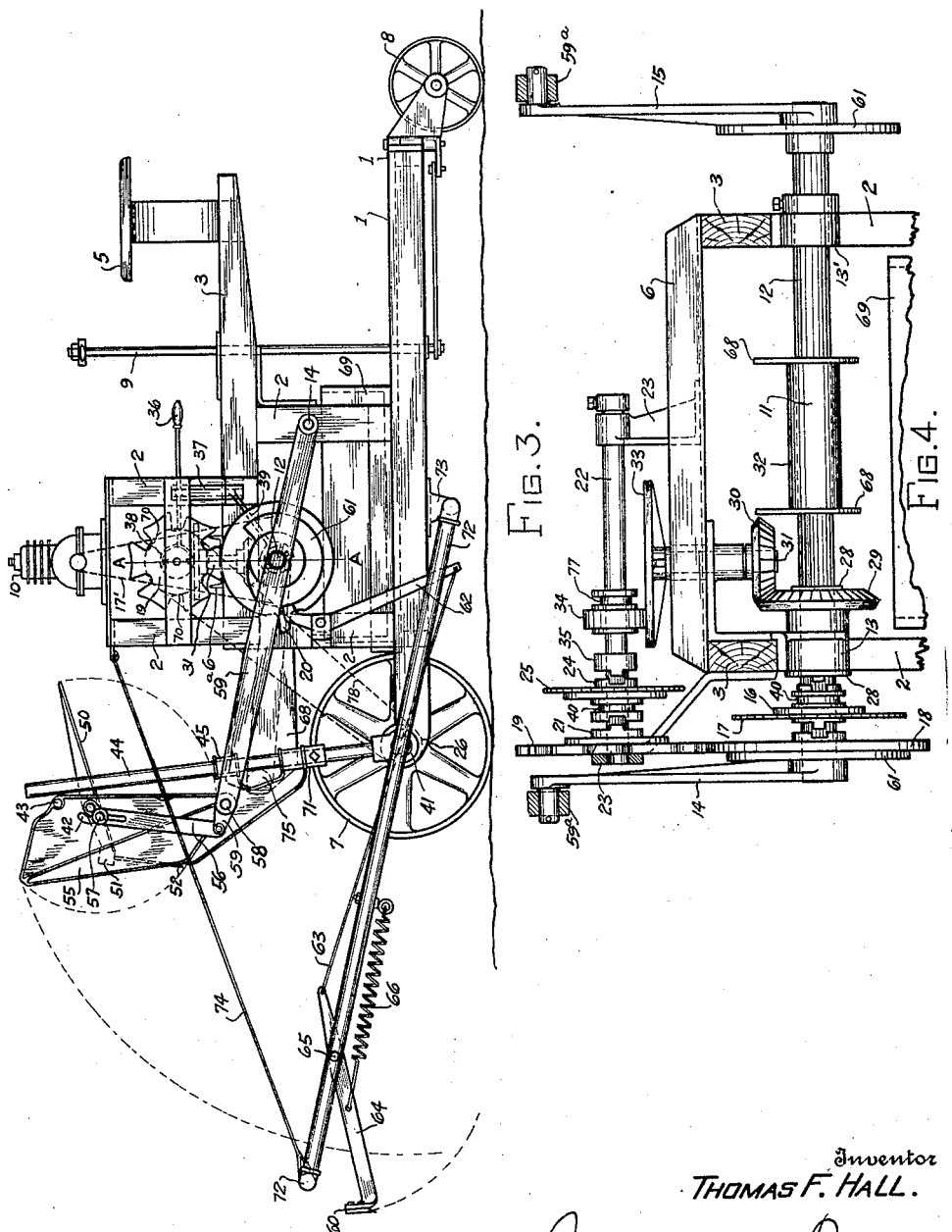

T. F. HALL

BERRY HARVESTER

Filed May 20, 1921

1,496,219

4 Sheets-Sheet 4

Inventor
THOMAS F. HALL.

By Willard Eddy,
Attorney

Patented June 3, 1924.

1,496,219

UNITED STATES PATENT OFFICE.

THOMAS F. HALL, OF OMAHA, NEBRASKA.

BERRY HARVESTER.

Application filed May 20, 1921. Serial No. 471,166.

*To all whom it may concern:*

Be it known that I, THOMAS F. HALL, a citizen of the United States, residing in the city of Omaha, county of Douglas, and State of Nebraska, have invented certain new and useful Improvements in a Berry Harvester, and have described the same in the following specification, illustrated by the accompanying drawings.

My improvements relate to that class of self-moving machines which are used in gathering berries, especially cranberries, from their parent stems, or vines, rooted in the soil, and which individually comprise a wheeled vehicle, a trap, or picker, which is mounted on the vehicle, and automatic means for operating the picker. It is the main object of the invention to gather the berries without injuring either the fruit or the vines; to clear the picker periodically from adhering vines or leaves; to cut off at a suitable height above the ground any vine runners that may be caught up by the picker; to strip the vines clean of berries; and in general to increase the efficiency of machines of this class. To accomplish these results, I incorporate in my improved berry harvester, as parts thereof, a picker which is of special construction, means for rendering the forward movement of the vehicle either continuous or intermittent as may be desired, means for imparting to the picker a horizontal reciprocating movement as well as opening, closing, self-emptying and self-cleaning movements, independently of the forward movement of the machine and during the intermissions thereof, and a cutter which is adapted to swing between the ground and the picker when the latter is lifted.

Figure 5:
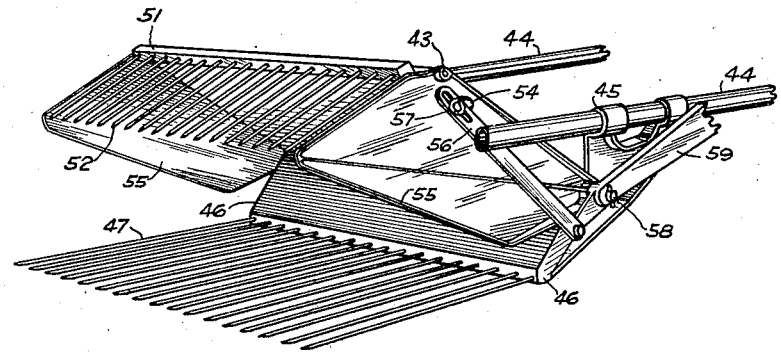
Figure 6:
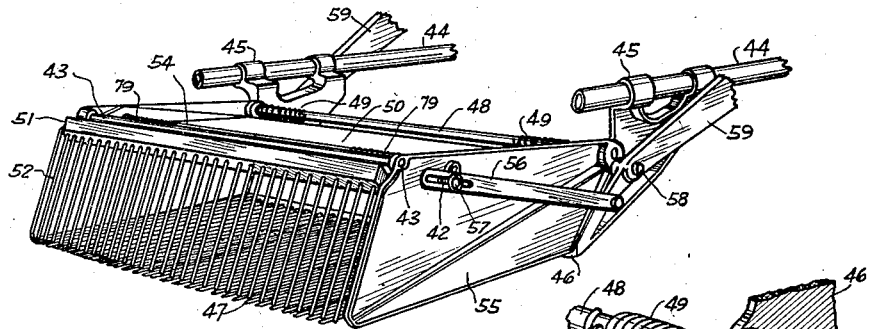
Figure 7:
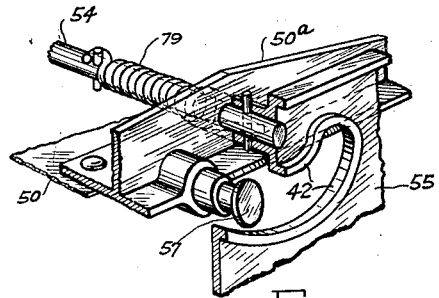
Figure 8:
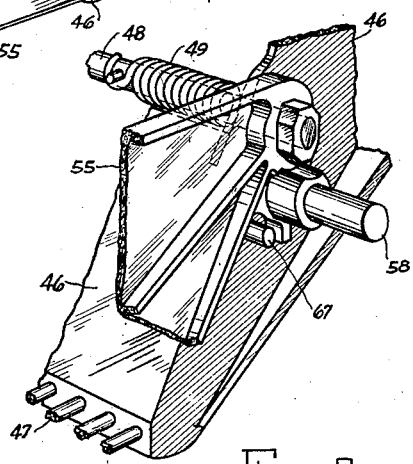

In said drawings, illustrating the best manner in which I have contemplated applying the principles of the invention, Fig. 1 is a side elevation of a berry harvester which is constructed in accordance with these principles. Fig. 2 is a plan of parts of the same machine and a section on the section line 2—2 of Fig. 1. Fig. 3 is a side elevation of the same machine with its picker operatively positioned for discharging its contents onto the endless carrier leading to a receptacle. Fig. 4 is a rear elevation of the drive mechanism, partly sectional on the section line A—A of Fig. 3. Fig. 5 is a detail, being a perspective view of the picker, with its jaws open. Fig. 6 is a similar view of the picker with its jaws closed. Figures 7 and 8 are details, being perspective views of portions of the picker.

In these drawings the chassis of the illustrated harvester comprises the chassis frame 1, which is shown in Figures 1, 2 and 3, the framework having the vertical members 2, longitudinal members 3 and transverse member 6 which are erected thereon, the engine 10 and the driver's seat 5, which are mounted on the framework, the carrying wheels 7 which are loose on the non-rotating shaft 41 at the front of the chassis frame, the carrying wheel 8 trailing at the rear of the chassis frame, and the steering gear, which comprises the steering rod 9, and suitable connecting mechanism controlling the wheel 8.

The picker, shown in detail in Figures 5, 6, 7 and 8, is a boxlike receptacle adapted to open and shut somewhat after the manner of a boxtrap. It has the vertical side walls, or cheeks, 55, which are tied together by the cross rods, or bolts, 43, 48 and 54. It has the rectangular cover plate 50, which is provided with the affixed marginal and angular castings 50$^a$ and thereby is pivoted between the side walls on the cross rod 54, and yieldingly held in the horizontal or closing position shown in Figures 5 and 6, by the coiled springs 79 tensioned on this rod. It has a plurality of parallel equidistant tines, or teeth, 52, projecting downward at an obtuse angle from the front edge 51 of the cover plate 50 by which they are carried, and forming the front of the box. It has the plane back wall 46, to which the side walls are pivoted on the cross rod 48; while the coiled springs 49 on this rod are adapted to counter-balance the cover and the side walls, and to assist the picker to be opened as shown in Fig. 5. This opening of the picker is limited by the stop pin 67. The picker has a floor, or bottom, consisting of a plurality of parallel and equidistant tines, or teeth, 47, which project forward in a horizontal plane from the bottom edge of the wall at an obtuse angle with the latter. Thus the upper jaw of the picker comprises the side walls or cheeks 55, the cover plate 50 which is pivoted between them, and the upper tines 52 which are secured to the front edge of the cover; while the lower jaw comprises the rear wall 46 and the lower teeth 47 which project from the rear wall to admit the upper teeth between them; and these jaws are united in a hinge joint by the cross rod 48. For the support of the picker, the back wall 46 has a pair of rearwardly and upwardly extended sleeves, or tubular bearings, 45, which are slidable on the parallel guide rods 44 hereinafter described. For engagement with the push rod extensions 59ª hereinafter mentioned it has two trunnion-like wrist-pins 58 projecting from the opposite ends of the wall 46. Two alined pins 57, projecting from the opposite cover castings 50ª in parallelism with the pivot-rod 54, extend through arcuate slots 42 in the side walls 55 and are adapted to engage as wrist-pins the slotted connecting rods 56 which are hereinafter mentioned.

The drive mechanism of the harvester comprises the main shaft 12, which is actuated by the crankshaft of the engine, and the countershaft 22, which is actuated by the main shaft. This main shaft, seen best in Fig. 4, is journaled through the bearings 13 and 13' on the framework members 3. It has on its opposite ends the duplicate and parallel crank arms 14 and 15, as well as the cams 61 which are affixed to these arms respectively. On this shaft are also placed the drum 11, which is keyed thereto, the peripherally grooved clutch member 16, which is both rotatable and slidable on the shaft, the sprocket disk 17, which is carried by the clutch member 16, and is connected with the engine 10 by the chain 17' the disk 18, which has a radially projecting tooth 20 and is fixed on the hub of the crank arm 14, and the clutch member 28, which extends rotarily through the bearing 13 and carries the bevel gear 29. The countershaft 22, which is journaled in the bearings 23 supported on the cross tie 6, carries the friction pinion 34, the collar 35, the sprocket 25 and the intermittent gear 19. The hub of this pinion 34 is keyed slidably on this shaft, and has a peripheral groove 77. The collar 35 is a clutch member, which is fastened to the shaft. The intermittent gear 19 has a hub 21 which is a clutch member keyed on the shaft. It has a plurality of uniformly spaced notches 70, adapted to accommodate successively the tooth 20 of the disk 18, and a corresponding plurality of concave edges 27, alternating with the notches and adapted to engage the equally convex periphery of the disk 18. The sprocket 25 has a hub 24, which is a slidable clutch member rotatable on the shaft and adapted to engage alternatively the collar 35 and the hub 21. Between the shafts 12 and 22, the shaft 31, which is journaled in a vertical position in the cross member 6 of the framework, carries both the bevel gear 30 which meshes with the bevel gear 29, and also the friction plate 33, which engages the friction pinion 34.

Connected with this drive mechanism are the main push rods 59ª, the knife 60, and the endless carrier 32. The guide rods 44 are a pair of duplicate and parallel radial arms loose on the opposite ends of the shaft 41, which slidably support the tubular bearings 45 for the guidance of the picker and are provided each with the stop collar 71. The push rods 59ª are a pair of duplicate and parallel push rods, pivotally connected with the cranks 14 and 15, and having extensions 59 and 59 which are fulcrumed on the wristpins 58 and 58 respectively and are pivotally connected with the slotted connecting-rods 56 and 56 respectively which engage the pins 57. The knife 60 is a swinging blade carried by and spanning transversely a pair of parallel lever arms 64, which are cross-connected thereby. These arms are fulcrummed in the rectangular frame of tubing 72, which is secured to the chassis frame by the brackets 73 and to the top of the framework 2 by the cable 74. They are actuated in the cutting direction by the springs 66 and in the opposite direction by the cables 63 and by the levers 62 which are fulcrummed on the framework 2 and are engaged and actuated by the cams 61. The endless carrier 32 is a belt which is adapted to deliver berries to the berry receptacle, or container, 69. It runs on the drum 11 and on the roller 75, which is journaled in the spaced and parallel guard plates 68 and 68 extending along the opposite edges of the belt. These plates are provided with the mutually convergent sloping wings 76 and 76 respectively. The driving mechanism is controlled by the double-clutch hand-lever 36 which is fulcrummed on the framework by the bracket 37. This lever has two arms terminating in the forks 38 and 39, running in the clutch groves 40 and 40 respectively, and is adapted to slide the clutches 16 and 24 in unison, right and left on their respective shafts; while the direction of rotation of the shaft 22, as well as its speed relatively to that of the shaft 12, is controlled by a forked lever, not shown in the drawings, which runs in a similar and well known manner, in the peripheral groove 77 of the hub of the friction pinion 34, and is adapted to slide this pinion from the edge to or past the center of the friction plate 33.

In the operation of the invention, the machine, having its parts in position as in Fig. 3, and moving continuously under its own power, is guided to a cranberry bed by manipulation of the steering-rod 9. During such locomotion, the lever-handle 36 having been thrown to the left, and the clutches 16 and 24 to the right, power is transmitted from the engine to the left carrying wheel 7. which is the drive wheel, by way of the sprocket chain 17', the sprocket disk 17, the clutch 16, the sleeve 28, the bevel gears 29 and 30, the shaft 31, the friction gearing 33 and 34, the countershaft 22, the clutch collar 35, the clutch and sprocket 24 and 25, the sprocket chain 78, and the sprocket 26 on the hub of the driving-wheel 7.

On arriving at the cranberry bed, the driver shifts the lever handle 36 to his right and thereby slides the clutches 16 and 24 to the left on their respective shafts. Thereby he interrupts the continuous travel of the machine and causes the latter to be advanced step by step intermittently by the power which is transmitted from the engine to the driving wheel through the chain 17', the sprocket 17, the toothed disk 18, the notched disk 19, the clutch 24, the sprocket 25, the sprocket chain 78, and the sprocket 26 on the hub of the drive wheel 7; and, by the same movement of the lever 36, he causes the cranks 14 and 15 on the main shaft to be continuously rotated therewith. By this movement of the cranks and the resulting movement of the push rods 59$^a$, the picker is first let down to the ground on and with the guide rods 44. At the same time the cover 50 swings on its pivot rod 54 and closes the picker, as in Fig. 6. At the same time the disk 18, which once in each complete revolution rotates the gear 19 on the shaft 22 through a predetermined angle, preferably an angle of sixty degrees, and which during the rest of the revolution locks the machine immovably, imparts a partial rotation to the last-mentioned gear and causes the vehicle to travel forward a distance approximately equal to the length of the picker tines 47. As the movement of the cranks and side rods continues, the picker is then opened as in Fig. 5, pushed forward an equal distance along the ground with its lower tines 47 among the vines and below the berries, and then closed upon the contained vine branches and berries in the position shown in Fig. 1. By the continued movement of the cranks and push rods the picker is then drawn backward on the guide rods 44 until it engages the stop collars 71, and then upward with these rods to the discharging position shown in Fig. 3. During this upward movement of the picker the main shaft rotates through a small angle without actuating the picker cover 50, and then by its further rotation swings the cover open by means of the slotted connection rods 56. At the same time the tines 47 are cleaned of adhering leaves and stringers, if any, by the tines 52. Immediately after the picker so leaves the ground, the knife 60, being released by the movement of the cams 61, and actuated by the pull of the springs 66, swings backward between the picker and the ground and severs the vine branches, if any, which have been caught up by the picker tines. From the picker so lifted and opened, as in Fig. 3, the contained berries slide and drop onto the endless carrier 32, and are discharged thereby into the container 69. Then the picker is lowered to the ground again in the same manner, and the same cycle of movements is repeated continually until the step by step advancement of the vehicle is stopped. By moving the handlever 36 to the left, and thereby sliding the clutch members 16 and 24 into engagement with the clutch sleeve 28 and the clutch collar 35 respectively, the driver stops the cranks 14 and 15 and the intermittent drive motion at any time, and causes the machine to resume its uniform locomotion. Moving this handlever at any time to a position midway between the right and left positions referred to, slides the clutch member 16 to a neutral position where it is rotated by the engine idly.

I claim as my invention—

1. A berry harvester comprising a motor-driven vehicle, transmission mechanism thereon, and a berry picker adapted to be operated by the transmission mechanism and having side walls in spaced relation, an upper jaw pivoted to the side walls and a lower co-acting jaw to which the side walls are pivoted.

2. A berry harvester comprising a vehicle having a motor drive, a berry picker having side walls and a pair of coacting jaws to one of which the side walls are pivoted and the other of which is pivoted to the side walls, and means actuated by the motor for opening and closing the jaws.

3. A berry harvester comprising a wheeled vehicle, means for propelling the vehicle, a berry picker, means for operating the picker, a knife, and means for moving the knife relatively to the picker.

4. A berry harvester comprising in combination a selfmoving vehicle, a berry picker, means for operating the picker, a knife, and means for oscillating the knife between the picker and the ground.

5. A berry harvester comprising a vehicle having a motor drive, transmission mechanism thereon, and a berry picker adapted to be operated by the transmission mechanism and having a pair of vertical side walls rigidly connected together in spaced relation, a cover plate pivoted between the walls, a plurality of front tines carried by the cover plate, a back wall to which the side walls are pivotally united, and a plurality of tines projecting forward from the back wall.

6. A berry harvester comprising a wheeled vehicle having a motor drive, a pair of parallel guide rods pivoted to the vehicle, a berry picker slidable on the guide rods and having forwardly projecting tines, means for turning the rods pivotally and for advancing, retracting and operating the picker thereon.

7. A berry harvester comprising a vehicle having a motor drive, a picker, a frame secured to the vehicle, a knife pivotally connected with the frame, a spring between the knife and the frame, and means connected with the motor for operating the picker and the knife.

8. A berry harvester comprising a vehicle, means for propelling the vehicle step by step with pauses between the steps, a picker having pivotally connected jaws, means for opening and closing the jaws, and means for moving the picker forward and then an equal distance backward on the ground at each of the pauses in the movement of the vehicle.

9. A berry harvester comprising a motor-driven vehicle, a berry receptacle, a picker, an oscillatory knife, and transmission mechanism connected with the motor for operating the picker and for moving the knife relatively thereto.

10. A berry picker comprising a pair of side walls rigidly connected together in spaced relation, a cover plate pivoted between the walls, a plurality of front tines projecting from the cover plate, a back wall to which the side walls are pivotally joined, and a plurality of parallel tines projecting forward from the back wall and adapted to admit the front tines between them.

11. A berry picker adapted to be opened and closed and comprising a pair of vertical and parallel side walls rigidly connected together in spaced relation, a cover plate pivoted between the walls, a plurality of front tines projecting downward from the cover plate, a back wall to which the side walls are pivotally joined, and a plurality of straight and parallel tines projecting forward from the back wall and adapted to be pushed forward on the ground lengthwise among the vines while the picker is open and to be pulled longitudinally backward on the ground after the picker is closed.

12. A berry picker comprising a pair of parallel side walls rigidly connected together in spaced relation, a rear wall to which the side walls are pivoted, a plurality of tines projecting from the rear wall and adapted to pass lengthwise among the vines forward and backward under the berries, and a cover plate pivoted between the side walls and having tines adapted to retain the berries in the picker.

13. A berry picker comprising a pair of side walls rigidly connected together in spaced relation, a rear wall pivoted to the side walls and having a plurality of parallel spaced tines constituting the floor of the picker, and a cover plate pivoted between the side walls and having a plurality of spaced tines constituting the front of the picker and adapted to swing between the floor tines.

14. A berry harvester comprising a wheeled vehicle, a motor, intermittent transmission mechanism between the motor and the driving-wheels of the vehicle for propelling the vehicle step by step with pauses between the steps, a berry picker, and intermittently acting transmission mechanism between the picker and the motor for reciprocating the picker; whereby the picker is moved forward and then backward at each of the pauses in the progress of the vehicle.

15. A berry harvester comprising a picker for stripping the berries from the vines, and intermittently acting means including a crank and a pushrod for advancing the picker from its initial position on the ground and for pulling it backward horizontally on the ground to the same place and position.

16. A berry harvester comprising a motor, a berry picker having a pair of pivotally connected jaws, a pair of pivoted guide rods having sliding engagement with the picker, and means actuated by the motor for sliding the picker on the guide rods and for opening and closing the jaws.

17. A berry harvester comprising a motor, a picker for stripping the berries from the vines, a pair of parallel and pivoted guide rods having sliding engagement with the picker, and a crank and pushrod which are actuated by the motor and pivotally connected with the picker.

18. A berry harvester comprising a motor-driven chassis, a swinging guide frame pivoted thereto, a berry picker slidable on the guide frame, and means actuated by the motor for sliding the picker on the guide frame and for swinging this frame on its pivotal axis.

19. A berry harvester comprising a wheeled vehicle having a motor, means actuated by the motor for advancing the vehicle uniform distances by successive steps with pauses between the steps, a berry picker having hinged jaws, and means for opening and closing the jaws and for moving the picker forward and backward on the ground during the pauses between the steps.

20. A berry harvester comprising a vehicle having drive-wheels and a motor, a reciprocable picker for pulling the berries from the vines, an endless carrier, and transmission mechanism whereby the motor is adapted to actuate the drive-wheels, the reciprocable picker and the carrier.

Witness my signature at Omaha, Nebraska, May 12, 1921.

THOMAS F. HALL.